May 24, 1927.
E. E. CRONENWETH
1,630,111
TIRE CHAIN APPLIER
Original Filed May 17, 1924    4 Sheets-Sheet 1
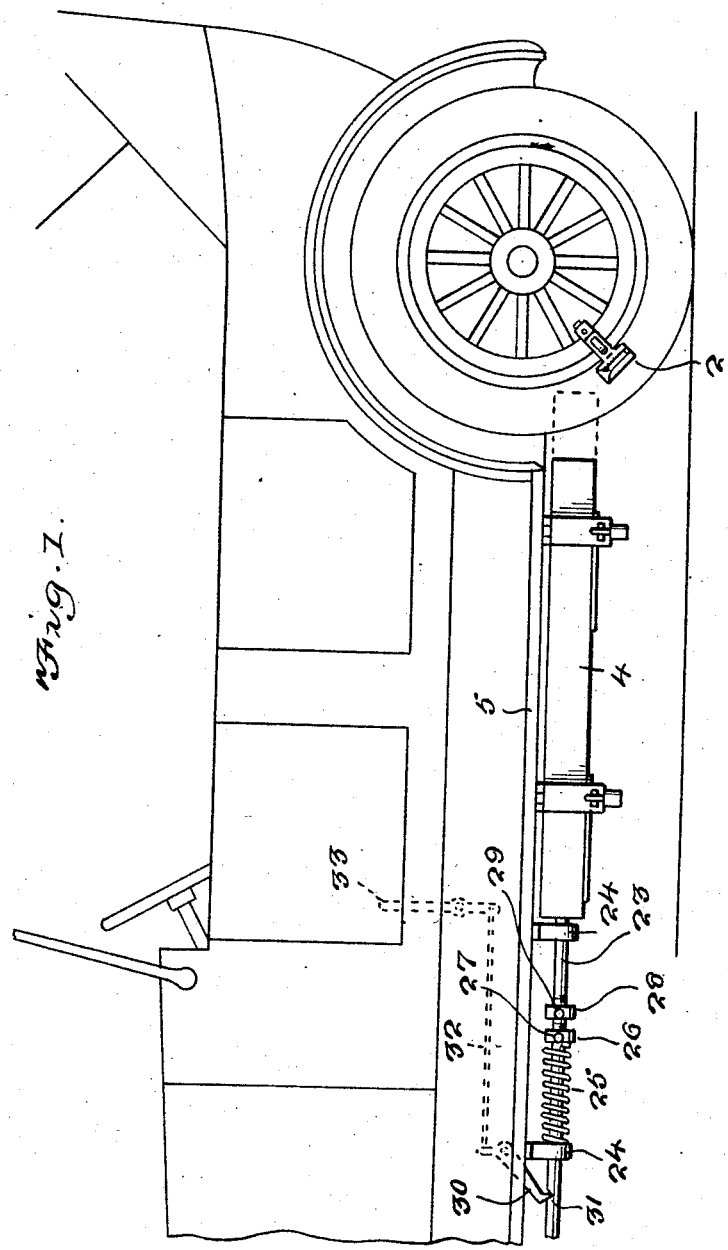

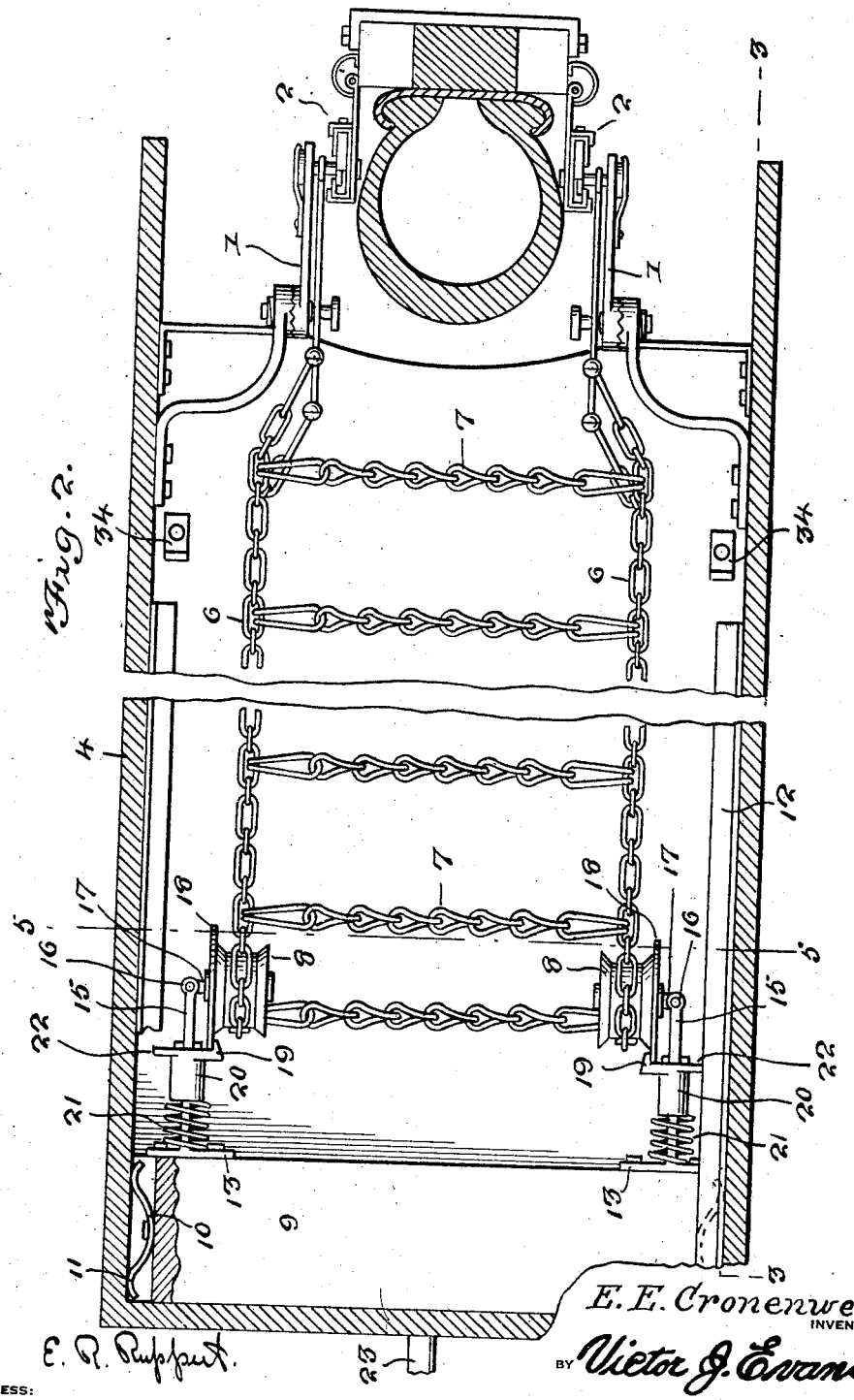

May 24, 1927.
E. E. CRONENWETH
1,630,111
TIRE CHAIN APPLIER
Original Filed May 17, 1924   4 Sheets-Sheet 3
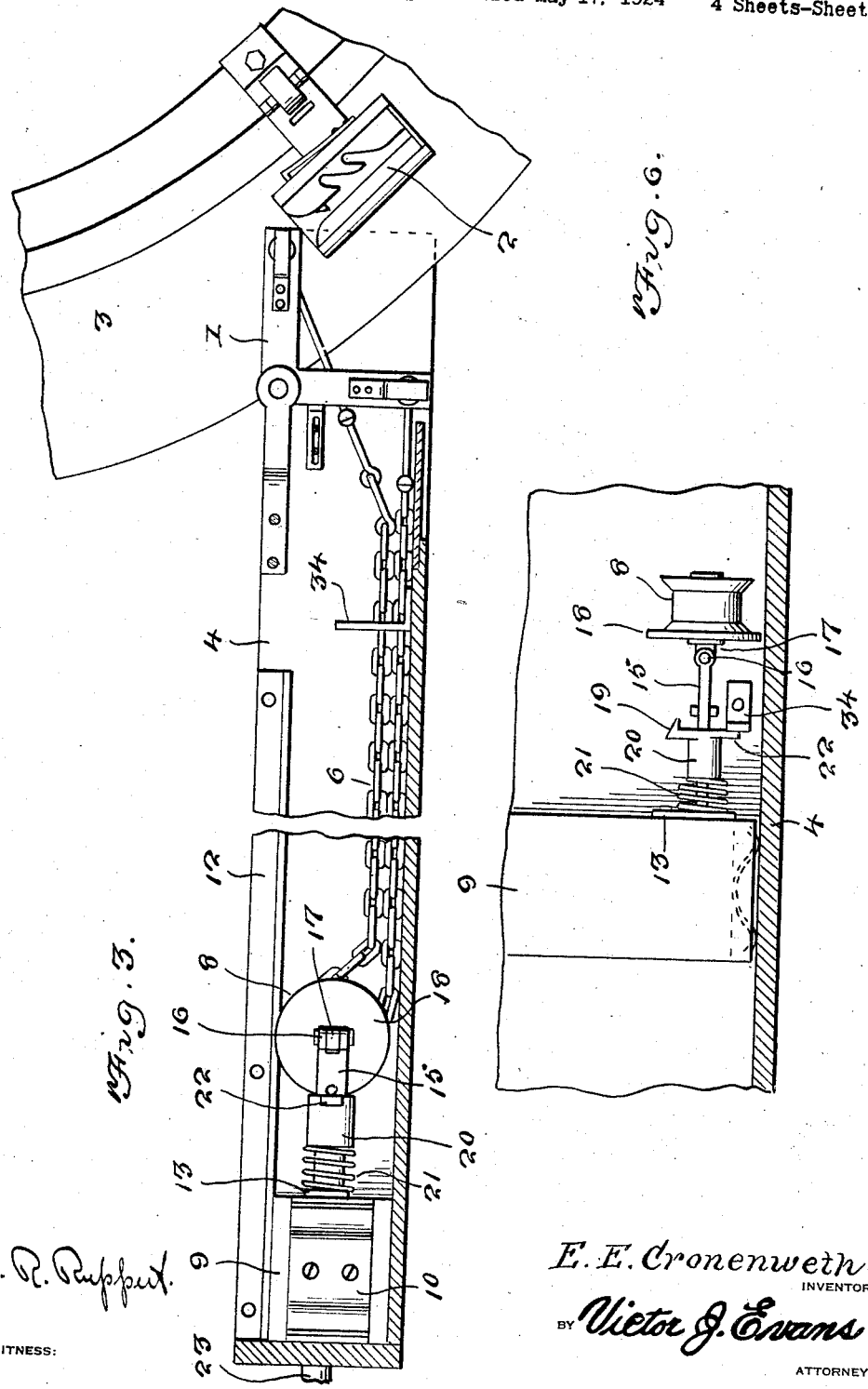

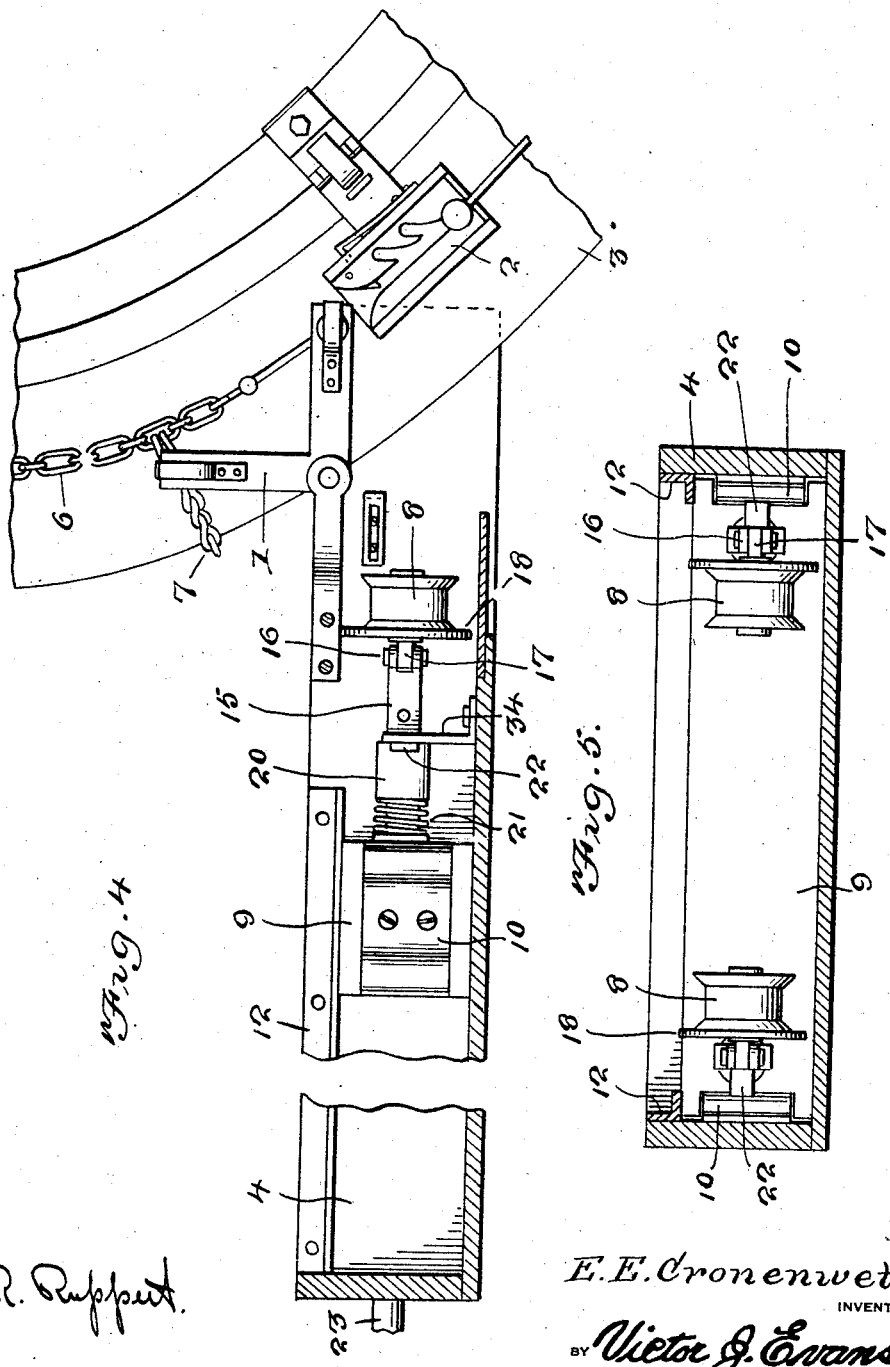

Patented May 24, 1927.

1,630,111

UNITED STATES PATENT OFFICE.

EARL E. CRONENWETH, OF GLENDALE, CALIFORNIA.

TIRE-CHAIN APPLIER.

Application filed May 17, 1924, Serial No. 714,119. Renewed November 15, 1926.

My present invention has reference to a means for automatically applying anti-skid chains around the drive wheels of an automobile and clamping the same thereon in a manner as disclosed in my U. S. Patents No. 1,487,317, granted on March 18, 1924, and No. 1,511,657, granted October 14, 1924.

My present invention is primarily directed to means for holding the tire chains in the boxes provided therefor and for permitting the free outward movement therefrom when engaged by the means on the drive wheels which wind the said chains therearound.

With the above broadly stated objects in view, the improvement resides in the construction, combination and operative association of parts such as is disclosed by the drawings which accompany and form part of this application.

In the drawings:—

Figure 1 is a side elevation of an automobile provided with the improvement.

Figure 2 is a horizontal sectional view of the chain housing which is removably secured beneath the running boards of the automobile.

Figure 3 is a sectional view approximately on the line 3—3 of Figure 2.

Figure 4 is a view substantially similar to Figure 3, but showing the arrangement of parts when the last side links of the chain are to be engaged by the gripping means therefor on the rear or traction wheel of the machine.

Figure 5 is a sectional view on the line 5—5 of Figure 2.

Figure 6 is a fragmentary sectional view showing the position of the follower block and the elements associated therewith when the chain has been drawn off of the rollers carried by said block.

As the means carried by the traction or rear wheels of an automobile which engage the end links of the anti-skid chain may be of a construction similar to that set forth in my U. S. Patents No. 1,487,317 of March 18, 1924, and No. 1,511,657, of October 14, 1924, a detailed description thereof is not here believed necessary, it being deemed merely necessary to state that headed elements carried on the side members of an anti-skid chain are loosely associated with a pivotally supported angle lever 1 and are designed, one after the other, to be received in foldable holding means 2 attached to the felly of the rear or traction wheel 3 of the automobile.

Also the box or housing for the anti-skid chain, indicated in the drawings by the numeral 4, is of a construction substantially similar to my referred to patent application, the same being removably secured but firmly held beneath the running board 5 of the automobile. The housing has its outer end open and to its sides there is pivoted the center of the angle or bell crank lever 1.

It will be noted, as the description progresses, that with my present construction I have eliminated the employment of means for holding the lower transverse elements of the anti-skid chain properly spaced from the upper elements thereof. The side members of the anti-skid chain are indicated by the numeral 6 and the transverse or cross chains by the numeral 7. In carrying out my present invention, I arrange the side chains 6 over rollers 8 that are normally retained in the rear of the housing, the chains being trained around the rollers and being engaged by the means on the arms of the bell crank lever 1, hold the upper and lower leads of the said chain properly spaced.

Fitting snugly in the housing 4 there is a block 9. The block has secured on its ends the central inwardly bowed portions of flat springs 10. Each of the springs has its ends curved outwardly and inwardly, as at 11, and these ends exert a frictional contact with the sides of the box. Above the block and normally covering the springs 10 there are angle plates 12 that provide a track for the follower block 9.

Secured on the outer face of the follower block 9, by means 13 there are the flat base portions of rods 15. Each of these rods is pivotally connected, as at 16, to the outwardly extending short shafts 17 for the rollers 8. Before proceeding further, it is to be stated that the outer or normally confronting flanges of the rollers are so formed as to permit of the side element 6 of the anti-skid chain freely passing thereover when the rollers are swung angularly on their pivots 16, in a manner which will hereinafter be described. The inner flanges of the rollers terminate in flat disk-like portions 18, and each of these disks is engaged by a hook 19 formed on the outer end of sleeves 20. Each of the sleeves is mounted on the respective rods 15, and each of the sleeves is influenced away from the follower block 9 by a helical spring 21 that surrounds the rods. Preferably the rods are square in cross section as are the bores of the sleeves 20, and whereby the said sleeves are held from turning on the rods. Each of the sleeves, opposite its inner hooked end 19 is formed with an outwardly projecting lug 22.

The housing 4 has its sides projecting beyond its bottom at the end thereof adjacent the wheel, and secured to its opposite and closed end there is a rod 23 received through suitable bearings 24 hung from the running boards 5. Between the inner bearing 24 and a collar 26 which is preferably both threadedly secured on the rod 23 and held adjusted by a binding element 29, there is a spring 25 that influences the housing 4 toward the rear wheels of the automobile. Movement in such direction is limited by a stop collar 28, which is both threaded and bound on the rod 23 by an element 29. The element is in the nature of a collar and is contactable with the rear bearing 24 for the rod 23 when the rod is influenced by the spring 25, upon release of holding means, hereinafter to be described, for said rod.

The housings 4 are normally held in inward position beneath the running boards by pivotally supported dogs 30 engaging in notches 31 in the rod 23. The dogs 30 have loosely connected therewith rods 32, and to the said rods there is connected a pivotally supported lever 33 conveniently positioned with respect to the driver of the machine.

In the path of contact with the lugs 22, when the housings have been influenced to a determined extent by the springs 25, there is secured on the floor of the housing contact fingers or lugs 34.

As set forth in my referred to patents the holding means for the end links of the side chains are engaged by means adjacent to the ends of pivotally supported angle members, the upper arm of the angle member being in a position to deliver the holding means therefrom into pivotally supported catch means carried by the fellies of the wheels, and the said angle members will be turned to deliver the lower end links into the said catch means upon the complete turning of the wheel. This operation cannot, of course, take place until the spring holding dogs 30 for the housings are released, and the springs 25 move the housings to the position illustrated by the dotted lines in Figure 1 of the drawings. In drawing the chain outward of the housings 4 the follower block 9 and the chain carrying grooved wheels will be moved therewith, the chains traveling freely over the grooved wheels. At the proper moment the lugs 22 will contact with the stop fingers 34, moving the collars 20 against the resistance of the springs 21 to bring the hooks 19 out of engagement with the flanges 18 on the rollers. A further pull by the chains will swing the rollers rightangularly to swing on their pivots to the positions illustrated in Figures 4 and 6 of the drawings. Thus the chains are drawn off of the rollers and the lower end links thereof arranged in a position to be engaged by the catch means on the wheels.

It is believed that the foregoing description, when taken in connection with the drawings will fully set forth the construction and advantages of the improvement to those skilled in the art to which such inventions relate, it being merely necessary to add that two of the devices as described are arranged one on each side of the automobile, so that the anti-skid chains will be simultaneously and automatically applied to both drive wheels of the machine.

Having described the invention, I claim:—

1. In combination with an automobile having means on the drive wheels thereof to engage with and to fasten there-around the ends of anti-skid chains, and housings disposed below the running boards having angle pivotally supported means on the sides thereof connected to one of the end links of the anti-skid chains, in combination with means for bodily moving the housings to arrange first one end of the anti-skid chains to engagement with the means on the wheels, and thereafter on the turning of said wheels to wind the chains around the wheels and to bring the second ends thereof into engagement with the said means on the wheels; of means for holding and guiding the chains in the housings, comprising each a follower block, frictional means between the ends of the block and the sides of the housing, rollers pivotally associated with the follower block, means holding the rollers at right angles to the follower block to arrange the same in a position to receive the side elements of the anti-skid chain therearound, and means for releasing said holding means to permit of the swinging of the rollers and the movement of the chain therefrom prior to the arrangement of the last side links on the wheel.

2. In combination with an automobile having means on the drive wheels thereof to engage with and to fasten the ends of the anti-skid chains thereon, and housings for the chains disposed below the running boards of the machine and having pivotally supported angle members on the sides thereof, spring means holding the housings in one position and release means for permitting the outward sliding of the housings to arrange the end links of one of the leads of the chains on the wheels and to permit the turning of the wheels to swing the angle members to arrange the end links of the second leads of the chains on the wheels; of means holding the chains folded in the housings and for guiding the chains therethrough, comprising each a follower block, a track therefor, friction means between the housing and the ends of the follower block, rods on the follower block, rollers pivotally secured to the rods, spring influenced means on the rods to engage with the inner ends of the rollers to hold the same right angularly with respect to the follower block but not interfering with the free turning of the rollers, said rollers having guided therearound the side members of the anti-skid chain and designed to be moved with the follower block when the chain is drawn therefrom, and means in the housing contactable with the spring influenced means for releasing the rollers therefrom to permit of the swinging of said rollers to release the chain therefrom when the said chain has been drawn a determined distance through the housings.

3. In combination with an automobile having means on the drive wheels thereof to engage with and fasten thereto the end links of an anti-skid chain, and a housing disposed below each of the running boards of the machine, each for the reception of an anti-skid chain, each of said housings having on the outer side thereof pivotally supported angle elements for engaging the respective end links of the chains, means holding the housings inward of the wheels, spring means for releasing the housings and moving the same in an opposite direction, actuating means for said spring means, and said chain holding means arranged when the spring means is actuated to first arrange one end of the anti-skid chains in one of the wheel engaging and fastening means and upon the turning of the wheels to cause the said holding means to be revolved and to bring the second end links of the chains into engaging with the fastening means on the wheels; of means for holding the chains folded in the housing and for guiding the chains when drawn therethrough, each of said means comprising rails on the sides of the housing, a follower block below the rails in the housing and normally sustained at the rear end of the housing, a centrally bowed spring having rounded ends secured to the ends of the follower block and bearing against the sides of the housing, rods fixed to the outer face of the follower block adjacent to the ends thereof, a roller pivotally secured on each rod and around which the side members of the chain are trained, a spring influenced sleeve slidable on each rod having a hooked end to engage one flange of each roller, stop elements in the housing adjacent to the outer end thereof contactable with the sleeves when the latter are drawn outwardly with the rollers and follower block by the outward movement of the chain whereby to move the sleeves against the pressure of their springs and to bring the hooks out of engagement with the rollers to permit of the swinging of said rollers and the sliding of the chain off of said rollers.

In testimony whereof I affix my signature.

EARL E. CRONENWETH.